United States Patent Office 3,388,083
Patented June 11, 1968

3,388,083
NOVEL RUBBER/FIBER COMPOSITIONS AND
PROCESS FOR PREPARING SAME
Michael C. T. Kwok, Worcester, Mass., assignor, by mesne assignments, to Federal-Mogul Corporation, Detroit, Mich., a corporation of Michigan
No Drawing. Filed June 1, 1964, Ser. No. 371,797
12 Claims. (Cl. 260—17.4)

ABSTRACT OF THE DISCLOSURE

An improved rubber product comprising an elastomeric composition incorporating therein as essential constituents from about 20% to about 50% by weight of a curable rubber and from about 5% to about 30% by weight of fibers distributed substantially uniformly throughout and a method of making resilient articles of the foregoing composition in which the article is formed to the desired size and configuration and is thereafter cured at an elevated temperature while in an unrestrained condition without incurring any significant shrinkage or distortion thereof.

---

This invention relates to a novel resilient, flexible, rubber/fiber composition which is particularly useful for sealing means such as gaskets, washers, seals, and so forth, and more particularly to automotive gaskets such as valve cover gaskets, oil pan gaskets, transmission pan gaskets, crank case gaskets, and the like.

The present invention is directed to a novel rubber/fiber composition which possesses physical properties such as tensile strength, compressibility and recovery, solvent resistance, and dimensional stability which make such compositions particularly useful for various industrial purposes and particularly for the production of gaskets. The present invention also contemplates a novel method of preparing such rubber/fiber compositions. The novel rubber/fiber compositions of the present invention comprise a rubber composition, preferably of an oil-resistant rubber, which contains not more than about 30 percent fiber based on the entire composition.

While the novel compositions of the present invention have a number of applications, the novel composition and properties of the compositions are best described in terms of gasket materials.

In the past gasket compositions generally comprised cork, rubber, or cork-rubber combinations. Such prior art gaskets were subject to a variety of deficiencies. For example, cork gaskets lacked dimensional stability. Cork gaskets shrink or expand during storage depending upon the humidity and other conditions existing when they were cut. It has become common in the trade to soak cork gaskets in water in order to expand them to the proper size prior to use. Cork has also been coated with various materials in order to seal the surface and prevent such dimensional changes. Cork gaskets are also fragile and lack resiliency; in use they acquire a permanent set which makes them subject to the possibility of leakage and which also precludes their effective reuse. While all-rubber gaskets are generally considered superior to cork gaskets, particularly with regard to dimensional stability and compressibility and recovery properties, rubber is, however, subject to cold flow. Cold flow may be defined as the distortion and lateral creep of the rubber under pressure. In the case of gaskets cold flow can result in exposing more gasketing material to the effects of deterioration of the oil or water. Gaskets containing a relatively large amount of rubber are also subject to processing problems which involve the shrinkage of the gasket during curing. Such shrinkage may be decreased by increasing the amount of filler which is normally used in rubber compounding, e.g., carbon black or clay. However, the amount of filler necessary to provide a composition which would not shrink would result in a "dead" rubber, i.e., the compressibility and recovery characteristics which are so important to good sealing properties would be lost.

A rubber/fiber composition has now been found which is not subject to the above-mentioned and other deficiencies. In one embodiment the composition comprises an oil-resistant rubber and between 5 and 30 percent of fiber.

Unless otherwise stated, the percentages set forth in this application are on a weight basis.

The novel gasket material of the present invention is a permanently plasticized, oil-resistant, fiber-rubber composition. The gasket material possesses a combination of a number of superior properties not found in prior art materials such as high compressibility and recovery, low volume increase and low volume change after oil immersion (ASTM tests) and a high degree of residual torque. The gaskets are also more dimensionally stable and are not fragile. The gaskets are prepared with a minimum of waste. The composition is mixed, formed into a sheet, e.g., by calendering or pressing, and cut to the desired final dimensions prior to curing, thereby permitting the uncured scrap to be recycled and reused. The gaskets are then cured without molds or other restraining means and undergo substantially no shrinkage or a minimum shrinkage during said cure. Generally, the shrinkage is less than 0.5 percent, and in many cases there is substantially no measurable shrinkage at all.

The gaskets of the present invention are comprised of an oil-resistant rubber and about 5 to 30 percent by weight of fiber. As the fiber content increases, the hardness of the composition increases, and the material becomes less compressible. Also, as the fiber content increases, the shrinkage after cure decreases until at about the 10 percent fiber level no significant shrinkage occurs. The level of fiber employed within the 5 to 30 percent range may be selected according to the degree of shrinkage in the cured product which is desirable or which can be tolerated in the finished article. For example, in gaskets which are about 19.5 inches long, a shrinkage of 0.1 inch is undesirable, particularly since bolt holes in the gasket may be displaced to some degree from their proper predetermined location. For such gaskets, it is preferable, therefore, to use a quantity of fiber sufficient to prevent any significant shrinkage in the gasket.

Gaskets of relatively small dimensions may satisfactorily use a quantity of fiber on the lower end of the range set forth above since the amount of shrinkage involved is generally negligible in a gasket of, say, 2 inches in length.

The preferred fiber content of the compositions of the present invention is about 10 to 30 percent fiber, i.e., the fiber range wherein substantially no measurable shrinkage occurs after curing, and more preferably, 10 to 15 percent. In selecting the particular fiber level, the effect of the fiber on the other properties should also be kept in mind.

The use of fiber in excess of 30 percent is undesirable because the material becomes too hard and the compressibility drops to a level which makes the composition undesirable for many uses. Processing at fiber levels in excess of 30 percent also becomes extremely difficult, primarily in the mixing and cutting steps.

The preferred rubbers for use in the present invention are oil-resistant rubbers. As example of suitable oil-resistant rubbers, mention may be made of butadiene-acrylonitrile, neoprene, and acrylic rubber. It should be further understood that various substituted rubbers such as silicone-based or boron-based rubbers may be used in the present invention. Two or more different rubbers may be used in the gasket material, for example, in one embodiment of the present invention the rubber content of a gasket comprises 70 percent nitrile rubber and 30 percent neoprene rubber. The rubber generally comprises about 20 to 50 percent by weight of the composition, and preferably about 25 to 30 percent. The preferred rubbers are medium and high acrylonitrile butadiene-acrylonitrile rubber.

The particular fiber selected is not critical. The fiber may be from natural or synthetic sources. Natural and synthetic organic fibers, e.g., cellulose, cotton, nylon, and Dacron, are the most advantageous in the present invention. The preferred fiber is cellulosic. The length of the fiber is not critical; however, a relatively short fiber is preferred in order to speed the breakdown of the fiber during processing, preferably less than 10 mm. The fiber used in the present invention may also be in the form of paper or dry pulp. If paper is used, it is desirable to comminute or otherwise reduce the paper to a relatively small size, e.g., about 20 mesh, prior to addition to the mixer. Defiberized paper, i.e., paper which has been broken down to the individual fibers, may also be used. A greater degree of shrinkage control is achieved with a lesser amount of defiberized paper than with, e.g., comminuted paper. In one embodiment, less than 5 percent defiberized paper will provide the same degree of shrinkage control found with about 10 percent comminuted paper. The fiber may be mixed or coated with a paper impregnant, for example, neoprene rubber or glue-glycerine material. Such fibers would generally be obtained from paper which has been subjected to impregnation by various materials known to the art, for example, polymeric latices.

The use of fibers in association with a glue-glycerine impregnant has been found especially beneficial in preparing the compositions of the present invention. The glue-glycerine provides a plasticizing effect to the composition and promotes easier processing by reducing the tendency of the mix to blister during milling. The presence of the glue-glycerine does not substantially impair any of the other properties of gaskets prepared from the fiber-rubber compositions because the glue-glycerine itself is highly oil-resistant. However, since some slight increases in water absorption might be noted in compositions containing glue-glycerine, it may be desirable to limit the use of such compositions to applications in which the compositions will not contact water to any great extent.

The term glue-glycerine is understood to refer to a material for paper impregnation which comprises animal glue, glycerine, and cured with, for example, formaldehyde. It should be understood that the advantageous effect achieved by the presence of glue-glycerine in the novel composition of the present invention is not limited to the addition of the glue-glycerine in the form of a coating on the fiber. The glue-glycerine may be introduced into the composition separately from the fiber. Other plasticizers such as vulcanized vegetable oils may also be used in place of the glue-glycerine to achieve substantially the same results.

The novel compositions of the present invention preferably also contain fillers, plasticizers, curing agents, and accelerators.

Various inert fillers known to the art for use in rubber compositions may be used in the present invention. As examples of suitable fillers, mention may be made of clays, hydrated silica (Hi-Sil 233), wet processed whiting (Atomite), dry ground whiting, precipitated whiting (Witcarb R), titanium dioxide, calcium silicate, and carbon black. The fillers in the present composition function as processing aids and help to provide a smooth sheet. It should be understood that the amount of filler used in the present invention may be varied over a wide range depending upon the properties of the particular composition desired, particularly hardness. Increasing amounts of filler generally increase the hardness of the composition, but this can be compensated for by increasing the plasticizer content. Care should be taken to avoid excessive amounts of fillers in the formulation which may result in a "dead" composition. Fillers are used in the range of about 50 to 125 percent by weight of the rubber, preferably 100 percent. The rubber-filler-plasticizer ratio may be varied to provide the desired properties.

The composition of the present invention may also contain cured rubber scrap. For the purposes of this invention the cured rubber is not considered as a rubber in the formulation but is used in addition to the uncured, oil-resistant rubber as a filler or rubber extender. Cured rubber stock is not used in the formulations of the present invention as a substitute either for the above-described filler or for the oil-resistant rubber. The effect of the cured rubber on the properties of the composition is not substantial and is used primarily for economic purposes. Prior to incorporating cured rubber into the formulation, it is necessary to depolymerize the cured rubber by methods known to the art. The use of the depolymerized cured stock is advantageously used in the present invention in order to help keep the density of the formulation low. An amount of depolymerized cured rubber equal to the oil-resistant rubber may be used, however, generally less is used. The preferred amount of cured rubber is about 10 to 15 percent of the composition, by weight.

Plasticizers utilized are those well known to the art for use with the particular rubbers. As examples of suitable plasticizers, mention may be made of dioctyl phthalate, coumarone indene resin, dibutoxy ethyl sebacate, dibutyl phthalate, highly aromatic oils (Sundex 85), acetyl ricinoleates (Flexricin P-4), and dibutyl sebacate.

The amount of plasticizer utilized is not critical. It is limited only by the Durometer of the finished composition. It is desirable that the plasticizer content is not present in a level such that a finished material is produced having a durometer less than about 45 (Shore A).

The curing systems and the amounts utilized in the present invention are those known to the art for use with the particular rubber. As examples of suitable curing systems for use with butadiene-acrylonitrile rubber, the following compositions are given for illustrative purposes. Others will be readily apparent to those skilled in the art.

| Curing systems: | Parts per 100 parts butadiene-acrylonitrile rubber |
|---|---|
| (A) Tetramethyl thiuram disulfide | 3.0 |
| Sulfur | 0.3 |
| (B) Tetramethyl thiuram disulfide | 2.0 |
| Santocure (N-cyclo hexyl-2-benzo-thiazole sulfenamide) | 1.0 |
| Sulfur | 0.5 |
| (C) Tetramethyl thiuram disulfide | 1.0 |
| Benzothiazyl disulfide | 2.0 |
| Sulfur | 0.3 |
| (D) Tetramethyl thiuram monosulfide | 0.4 |
| Sulfur | 1.5 |
| (E) Benzothiazyl disulfide | 3.0 |
| Zinc dimethyl dithio carbamate | 1.5 |
| Sulfur | 0.4 |
| (F) 2-mercapto benzo thiazole | 1.5 |
| Zinc dimethyl dithio carbamate | 1.5 |
| Sulfur | 1.5 |

While rubber gaskets have found a high degree of acceptance in the past, the art has recognized that one of the major drawbacks of such gaskets is in the preparation, namely, the tendency of rubber gaskets to shrink (sometimes as much as 5 to 20 percent) upon curing. If the gasket is cut to the proper dimensions from the rubber sheet prior to curing, the stresses set up during cure will result in a smaller or deformed gasket. Alternatively, the entire rubber sheet could be cured and then a gasket cut from the cured sheet. However, since the cured scrap could not be conveniently reworked and whereas about 80 to 90 percent of the sheet stock often ended up as scrap, the economies makes such a course prohibitive. Another method for solving the problem of shrinkage is to utilize curing forms to hold the pre-cut gasket under restraint during curing. The cost of tooling up for such an operation necessitates large production runs to make the use of such molds economical. In addition, some degree of shrinkage occurs even with the use of such molds.

The most recent method the art has utilized to control shrinkage is taught in U.S. Patent No. 3,093,443, issued June 11, 1963, wherein the uncured gasket material is stabilized by supporting the uncured gasket frictionally on a rigid surface during the curing operation. Once again the solution to the problem of shrinkage during cure requires apparatus for the physical restraint of the gasket and, like the other prior art methods, fails to completely eliminate the problem. When the gasket, after curing, is removed from the device which frictionally restrains the gasket, the stresses set up within the gasket are released to cause deformation in the gasket.

Gaskets possessing the above-described properties of oil-resistance, compressibility and recovery, lack of cold flow, and other improved properties, are provided and can be prepared by the instant invention readily without expensive restraining devices or molds. The gaskets are cut to the proper final dimensions prior to cure, and then they are cured in an oven without any restraint whatsoever with a minimum of shrinkage or substantially no shrinkage.

In preparing the gaskets, the raw materials are first mixed in a suitable mixer such as a Banbury mixer to provide for a homogeneous mix of the materials. It may be desirable to apply heat to the mixer to provide some degree of plasticity to the rubber for easier mixing; however, care should be taken to insure that the temperature is not high enough to provide for any curing of the rubber during the mixing period. In a preferred embodiment the raw materials are mixed for about 10 to 15 minutes at a temperature of 200 to 250° F. The mix may then be treated in one of several alternate ways. The mix may be calendered into a sheet; it may be pressed, as by a platen press; or it may be extruded. After the formation of the sheet or the extrudate, it is allowed to equilibrate at rest to dissipate the stresses set up in the material by the processing steps. The material is then cut into gaskets of the proper size, the skeletons are recirculated and fed again into the calender or extruder, and the gaskets are cured. The preferred methods of forming sheet material is by calendering and by extrusion and cutting.

In an especially preferred embodiment, further shrinkage control after cure is provided by the selective orientation and distribution of the fibers in the sheet. The greater the degree of orientation in the sheet, the more effectively the shrinkage will be controlled in the direction of orientation. Uniform distribution and random orientation, i.e., homogeneous orientation in all horizontal directions, of the fibers in the sheet is preferred for further improved equalized shrinkage control.

In one embodiment the mix is processed on a rubber mill to smooth the mix by breaking up any lumps to get the proper flow characteristics prior to calendering. The rolls are generally cooled in order to once again prevent any appreciable premature cure in the rubber. In a preferred embodiment the rolls are cooled to a temperature of about 125 to 150° F. The mix is then calendered to a sheet of uniform thickness. After removing the stresses introduced into the sheet by calendering by allowing the sheet to equilibrate at rest, the sheet stock is then cut to provide gaskets of the proper dimensions, the skeletons are recirculated to the calender, and the gaskets are transferred to an oven to be cured. The gaskets are merely placed on trays or a traveling belt in the oven and are unrestrained in any way. The time/temperature relationship of the cure is variable and is dependent upon the particular rubber used. Generally, the temperature ranges from 275 to 400° F. and the time from 20 minutes to 14 hours. In a preferred embodiment the gaskets are cured at about 285° F. for 30 minutes.

While it is preferable that all the materials be placed in the Banbury mixer together, it should be understood that, if desired, various combinations of the base materials may be premixed prior to adding them to the Banbury mixer.

The curing of the composition, i.e., cross-linking or vulcanizing of the uncured rubber, may be carried out in any suitable curing zone which employs a gas-fired burner, infra-red rays, electrical induction heating, or the like. Generally, the material is carried through a heated zone in a continuous manner on a heated conveyor belt or wire transmission belt. Unlike prior art curing methods, however, no molds or restraining means are used.

The following nonlimiting examples illustrate the novel compositions and process of the present invention. The shrinkage in the following examples was measured by cutting a 19½-inch gasket prior to curing and determining the percent deviation from that size after cure.

Example 1

| | Parts by wt. |
|---|---|
| Butadiene/acrylonitrile rubber (medium acrylonitrile) | 100.0 |
| Neoprene (cured and depolymerized) | 40.0 |
| Stearic acid | 1.0 |
| Carbon black | 98.4 |
| Clay | 5.2 |
| Oil (Circo light oil) | 10.0 |
| Dioctyl phthalate | 15.0 |
| Cellulose fiber (comminuted glue-glycerine paper, 60% fiber/40% saturant, 20 mesh) | 70.0 |
| Zinc oxide | 7.0 |
| Sulfur | 0.5 |
| Tetramethyl thiuram disulfide | 1.0 |
| Benzothiozyl disulfide | 2.0 |

The above composition contained 12 percent fiber based on the total composition.

All of the ingredients were added to a Banbury mixer and mixed for 10 minutes at 230° F. The mix was then placed on a rubber mill and milled until a smooth consistency was obtained. The rolls were cooled to about 130° F. The mix was then calendered to provide a sheet ⅛ inch in thickness. After the sheet was allowed to equilibrate, automotive cylinder head cover gaskets 19½ inches in length were cut from the sheet. The gasket was then cured without restraint in an oven at 285° F. for 30 minutes. The gaskets were again measured and found to be still 19½ inches in length.

The gasket prepared in Example 1 had the following properties:

| | |
|---|---|
| Durometer (Shore A) | 59.0 |
| Tensile (p.s.i.) ASTM D1170 | 400.0 |
| Compressibility (ASTM 1147) 400 p.s.i. _ _percent _ _ | 37.0 |
| Recovery (ASTM 1147) 400 p.s.i. _ _ _ _ _ _do_ _ _ _ | 82.3 |
| Percent volume increase (70 hours at 300° F. ASTM No. 3 oil) _ _ _ _ _ _ _ _ _ _do_ _ _ _ | 4.0 |
| Percent tensile charge (70 hours at 212° F. ASTM No. 3 oil) _ _ _ _ _ _ _ _ _ _ _ _ _do_ _ _ _ | 4.0 |

FLEXIBILITY TEST (180° BEND AROUND MANDREL)

| Time | Conditioning | Result |
|---|---|---|
| Unaged | 75° F., 50% relative humidity | Pass. |
| 70 hours | 212° F., dry heat | Do. |
| Do | 300° F., No. 3 oil | Do. |
| 14 days | 300° F., No. 3 oil | Do. |

The gasket of Example 1 showed final torque of 8 in.-lbs. after an initial torque of 15 in.-lbs. This should be compared with an aluminum lacquer coated cork gasket which showed a final torque of 1 in.-lbs. with the same initial torque.

Example 2

| | Parts by wt. |
|---|---|
| Butadiene/acrylonitrile rubber (medium acrylonitrile) | 100.0 |
| Carbon black | 125.0 |
| Zinc oxide | 5.0 |
| Stearic acid | 1.0 |

Example 2—Continued

| | Parts by wt. |
|---|---|
| Dioctyl phthalate | 35.0 |
| Sulfur | 0.5 |
| Accelerators | 3.0 |
| Cotton linters (3–4 mm. in length) | 14.1 |

The fiber comprises 5 percent of the total composition.

The gaskets were prepared according to the procedure of Example 1.

The compositions of Examples 3 through 9 differed from Example 2 only in the cotton linters content. The properties of the compositions of Examples 2 through 9 are set forth below.

| Example No. | 2 | 3 | 4 | 5 | 6 | 7 | 8 | 9 |
|---|---|---|---|---|---|---|---|---|
| Cotton Linters (3–4 mm.): | | | | | | | | |
| Percent | 5 | 8 | 9 | 10 | 15 | 20 | 25 | 30 |
| Parts by weight | 14.1 | 23.5 | 26.6 | 30.0 | 47.5 | 67.5 | 89.5 | 115.5 |
| Durometer (Shore A) | 55 | 60 | 60 | 60 | 65 | 72 | 77 | 80 |
| Percent Compressibility (ASTM D1170) (400 pounds/inch $^2$) | 37.5 | 35.1 | 34.0 | 34.4 | 31.8 | 23.3 | 25.8 | 18.9 |
| Percent Recovery (ASTM D1170) (400 pounds/inch $^2$) | 83.5 | 85.3 | 85.8 | 85.8 | 87.2 | 86.5 | 84.2 | 80.2 |
| Percent Shrinkage (after cure) | 0.481 | 0.160 | 0.080 | None | None | None | None | None |
| Percent Weight Change (70 hours, 300° F., No. 3 Oil) | −1.92 | −2.03 | −2.24 | −1.41 | −2.12 | −1.73 | −1.08 | +4.42 |
| Percent Volume Change (70 hours, 300° F., No. 3 Oil) | −4.14 | −4.74 | −4.90 | −4.65 | −5.94 | −4.95 | −3.83 | −4.06 |

Gaskets were prepared having varying amounts of comminuted glue-glycerine saturated paper.

Example 10

| | Parts by wt. |
|---|---|
| Butadiene/acrylonitrile rubber (medium acrylonitrile) | 100.0 |
| Neoprene (cured, depolymerized scrap) | 40.0 |
| Stearic acid | 1.0 |
| Carbon black | 90.0 |
| Clay | 10.0 |
| Highly aromatic oil (Sundex 85) | 40.0 |
| Zinc oxide | 7.0 |
| Sulfur | 0.5 |
| Benzothiazyl disulfide | 2.0 |
| Tetramethyl thiurane disulfide | 1.0 |
| Glue-glycerine saturated fiber (comminuted 60% fiber, 40% saturant, 20 mesh) | 32.3 |

The composition contained 6% fiber based on the weight of the total composition.

Gaskets were prepared from the above composition according to the procedure of Example 1.

The compositions of Examples 11 through 14 differed from Example 10 only in the comminuted glue-glycerine paper content. The properties of Examples 10 through 14 are set forth below.

| Exmple No. | 10 | 11 | 12 | 13 | 14 |
|---|---|---|---|---|---|
| Comminuted Glue-Glycerine Saturated Paper (20 mesh): | | | | | |
| Percent fiber | 6.0 | 12.0 | 18.0 | 19.4 | 22.5 |
| Parts by weight (total) | 32.3 | 72.8 | 124.8 | 140.0 | 175.0 |
| Durometer (Shore A) | 50 | 64 | 68 | 70 | 72 |
| Percent Compressibility (ASTM D1170) (400 pounds/inch $^2$) | 49.7 | 31.0 | 25.8 | 24.4 | 22.1 |
| Percent Recovery (ASTM D1170) (400 pounds/inch $^2$) | 82.6 | 81.0 | 80.0 | 78.0 | 79.6 |
| Percent Shrinkage (after cure) | 0.321 | None | None | None | None |
| Percent Weight Change (70 hours, 300° F., No. 3 Oil) | +5.4 | +2.7 | +0.39 | +0.32 | −1.67 |
| Percent Volume Change (70 hours, 300° F., No. 3 Oil) | +6.0 | +2.3 | −1.0 | −0.8 | −2.1 |

Example 15

| | Parts by wt. |
|---|---|
| Neoprene | 100.0 |
| Magnesium oxide | 4.0 |
| Phenyl-beta-naphthylamine | 2.0 |
| Carbon black | 150.0 |
| Oil (Circo light oil) | 10.0 |
| Zinc oxide | 5.0 |
| Stearic acid | 0.5 |
| Trialkyl thiourea | 0.5 |
| Cotton linters (3–4 mm. in length) | 24.5 |

The composition contained 9 percent fibers based on the weight of the entire composition.

A gasket was prepared according to the procedure of Example 1. The gasket showed the following properties.

| | |
|---|---|
| Durometer (Shore A) | 76 |
| Compressibility (400 p.s.i.) percent | 18.9 |
| Recovery (400 p.s.i.) do | 84.3 |
| Shrinkage after cure | None |

In order to illustrate the advantages derived from the novel compositions of the present invention, a gasket was prepared as Example 1 with the exception that the composition contained no fiber. All other components were used in the same quantities. A 19½-inch gasket prepared from such a composition was found to shrink at least 0.22 in. (1.125%) upon curing. It is obvious that shrinkage of this order of magnitude on a 19½-inch gasket diminishes the effectiveness of such a material as a seal. The bolt holes in the gasket are displaced from the bolt holes in the engine block and the gasket would have to be distorted to make it fit.

Example 16

The composition of Example 12 was prepared but instead of milling and calendering, the mix was transferred directly from the Banbury mixer to a press. Shims were placed on the press bed to allow for the formation of a sheet ⅟₁₆ inch in thickness, and the mix was pressed at elevated pressure. The thus-formed sheet was then removed from the press and allowed to equilibrate at rest to allow the stresses set up in the pressing to dissipate. A gasket 6½ by 8 inches was cut from the sheet and was cured at 285° F. for 30 minutes. There was no significant shrinkage in any direction.

The novel compositions of the present invention are characterized by a Durometer (Shore A) of 45 to 80, preferably 55 to 65; a compressibility (ASTM D1170) under 400 p.s.i. of 20 to 60 percent, preferably 35 to 40 percent; and a recovery in excess of 70 percent.

Gaskets prepared from the novel fiber-rubber compositions of the present invention may comprise any form or shape. Since shrinkage is readily controlled in the novel gaskets of the present invention, distortion does not occur in irregularly shaped gaskets upon curing. The thickness of the fiber-rubber sheets of the present invention may vary over a relatively wide range and is limited only by the processing equipment utilized, particularly the calender. Generally, sheets ⅛ to ¼ of an inch thick are prepared.

In a preferred embodiment the composition comprises about 10 to 15 percent cellulosic fiber, more preferably comminuted paper (20 mesh), about 25 to 30 percent butadiene-acrylonitrile rubber, about 100 percent inert filler based on the rubber, about 10 to 20 percent plasticizer, preferably dioctyl phthalate, and the remainder depolymerized cured rubber scrap, curing agents, antioxidants, and accelerators.

In order to further illustrate the advantage of the novel compositions, a comparison was made with compositions containing cork. A series of experiments were carried out substituting granulated cork for the fiber in the formulation of Example 2. It was found that the presence of cork exerted no control over shrinkage after cure, the durometer is lower, the surface of the sheet is not smooth or even, and very long curing time is necessary due to the insulating properties of the cork. A 19½-inch gasket containing 20 percent cork was found to shrink as much as a control gasket which contains no cork or fiber. A formulation containing as much as 50 percent cork also failed to produce any appreciable degree of control of shrinkage after cure. Cork-containing gaskets also absorb a greater amount of oil and water than do the compositions of this invention.

While the rubber/fiber composition has been primarily defined in terms of gasket materials, it should be understood that the invention is not limited thereto and that the aforementioned properties of the novel composition make such materials useful in a large number of industrial applications. The constituents of the novel compositions may be varied within the ranges set forth to modify various properties, e.g., the hardness and compressibility, to develop the optimum combination of properties for the particular application involved. For example, novel sheet material within the scope of the present invention may be used as vibration pads. If used for such an application in heavy industry, high durometer (about 70 to 80) is desired; therefore, relatively high amounts of fiber (about 20 to 30%) will be used. If the vibration pad is to serve an acoustical purpose, then a relatively low durometer (about 55 to 60) with a corresponding low amount of fiber (about 5 to 10%) would be used. The novel compositions of the present invention may also be advantageously utilized as expansion joints both in road and building applications, moisture barriers in construction uses, weather stripping, and oil-resistant floor coverings. Other uses will be readily apparent to those skilled in the art from an examination of the properties of the novel compositions set forth herein.

What is claimed is:

1. A resilient seal consisting essentially of from about 20% to about 50% vulcanized rubber, from about 50% to about 125% of a nonfibrous particulated inert filler based on the weight of said rubber distributed substantially uniformly through said rubber, and from about 5% to about 30% by weight fiber distributed substantially uniformly through said rubber, said seal having a durometer (Shore A) of 45 to 80, a compressibility under 400 p.s.i. of 20% to 60%, and a recovery of at least 70%.

2. The seal as defined in claim 1 wherein said durometer is about 55 to 65, said compressibility is about 35% to 40%, and said recovery is about 80% to 85%.

3. The seal as defined in claim 1 in the form of a flexible gasket material and wherein said rubber consists of an oil-resistant rubber and wherein the content of said fibers is between about 5% and 20% by weight.

4. The seal as defined in claim 1 wherein said rubber is an oil-resistant rubber selected from the group consisting of butadiene-acrylonitrile rubber, neoprene as well as mixtures thereof.

5. The seal as defined in claim 1 further including a plasticizer in an amount such that the durometer of said seal is not less than about 45.

6. The flexible gasket material as defined in claim 3 comprising about 30% oil-resistant rubber, about 10% fiber, about 100% filler based on said rubber, and about 15% plasticizer.

7. The gasket material as defined in claim 6 wherein said rubber is butadiene-acrylonitrile rubber, said filler is carbon black, said fiber is cellulose fiber, and said plasticizer is dioctyl phthalate.

8. A process for making a resilient seal of accurate final dimensions which comprises the steps of compounding an uncured elastomeric mixture consisting essentially of from about 20% to about 50% of a curable rubber, from about 50% to about 125% of a nonfibrous particulated inert filler based on the weight of said rubber, and from about 5% to about 30% fibers distributed substantially uniformly therethrough, forming said uncured mixture into seals of a selected configuration and size, recycling the trim material derived during said forming and admixing said trim material for reuse with an additional quantity of said uncured mixture, placing the formed said seals on a support in an unrestrained condition, and thereafter curing the formed said uncured mixture forming a cured resilient seal without incurring any significant distortion or shrinkage of said seal from the initial uncured configuration and size.

9. The process as defined in claim 8, wherein said forming of said uncured elastomeric mixture includes the steps of forming said mixture into an elongated sheet and cutting a plurality of said seals from said sheet and wherein said trim material derived from said cutting is recycled for reuse by admixture with additional quantities of said uncured mixture.

10. The process as defined in claim 9, wherein said seals cut from said sheets are gaskets.

11. The process as defined in claim 8, wherein said shrinkage of said seals during said curing step is less than 0.5%.

12. The process as defined in claim 9, wherein said fibers are selectively oriented in the direction corresponding to the major direction of said sheet, and the cutting of said seals is achieved by orienting the major dimension of said seals substantially parallel to the direction of orientation of said fibers.

References Cited

UNITED STATES PATENTS

| | | | |
|---|---|---|---|
| 3,093,443 | 6/1963 | Levinson | 264—37 |
| 2,663,693 | 12/1953 | Hess et al. | 260—17.4 |
| 2,675,361 | 4/1954 | Howland | 260—17.4 |
| 2,772,970 | 12/1956 | Feigley | 260—17.4 |

WILLIAM H. SHORT, *Primary Examiner.*

J. NORRIS, H. D. ANDERSON, *Assistant Examiners.*